(12) United States Patent
Madonna et al.

(10) Patent No.: US 8,972,858 B2
(45) Date of Patent: Mar. 3, 2015

(54) CONFIGURATION INTERFACE FOR A PROGRAMMABLE MULTIMEDIA CONTROLLER

(75) Inventors: Robert P. Madonna, Osterville, MA (US); Michael C. Silva, East Sandwich, MA (US); Nicholas J. Cipollo, Boston, MA (US); David W. Tatzel, West Yarmouth, MA (US); David McKinley, Dartmouth, MA (US); Duarte M. Avelar, Plymouth, MA (US); Arthur A. Jacobson, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 233 days.

(21) Appl. No.: 13/451,310

(22) Filed: Apr. 19, 2012

(65) Prior Publication Data

US 2013/0283025 A1 Oct. 24, 2013

(51) Int. Cl.
*G06F 3/0484* (2013.01)
*G06F 3/041* (2006.01)
*G06F 13/10* (2006.01)

(52) U.S. Cl.
CPC .............. *G06F 3/0484* (2013.01); *G06F 3/041* (2013.01); *G06F 13/10* (2013.01)
USPC ........... 715/705; 715/708; 710/104; 717/167; 717/174

(58) Field of Classification Search
CPC ........ G06F 3/0484; G06F 3/041; G06F 13/10
USPC ........... 715/705, 708; 710/104; 717/107, 168, 717/174
See application file for complete search history.

(56) References Cited

U.S. PATENT DOCUMENTS

| 6,826,632 | B1 | 11/2004 | Wugofski |
| 7,043,691 | B1† | 5/2006 | Kwon |
| 8,078,970 | B1* | 12/2011 | Anderson ............ 715/735 |

(Continued)

FOREIGN PATENT DOCUMENTS

WO    WO-2008/033453 A2    3/2008

OTHER PUBLICATIONS

"Notification of Transmittal of the International Search Report and the Written Opinion of the International Searching Authority, or the Declaration," International Filing Date: Apr. 8, 2013, International Application No. PCT/US2013/035598, Applicant: Savant Systems, LLC, Date of Mailing: Jul. 17, 2013, pp. 1-11.

*Primary Examiner* — Ting Lee
(74) *Attorney, Agent, or Firm* — Cesari and McKenna, LLP

(57) ABSTRACT

In one embodiment, a user selects a primary component of a multimedia system to be configured in a configuration user interface of a mobile device. The configuration user interface of the mobile device displays a photo-realistic depiction of a back panel of the primary component. The photo-realistic depiction of a back panel includes photo-realistic depictions of connection ports located thereon. The user selects another component to be connected to the primary component. One or more classes of potential connections are determined between the another component and the primary component, and for each class of potential connection, the configuration user interface on the mobile device graphically guides the user to select a particular connection port on the photo-realistic depiction of the back panel of the primary component for the class of potential connection. Based on selections of particular connection ports from the user, a set of configuration data is generated.

20 Claims, 16 Drawing Sheets

(56) References Cited

U.S. PATENT DOCUMENTS

| | | |
|---|---|---|
| 2006/0064526 A1 † | 3/2006 | Smith |
| 2007/0142022 A1 | 6/2007 | Madonna et al. |
| 2007/0143801 A1 | 6/2007 | Madonna et al. |
| 2008/0127063 A1 † | 5/2008 | Silva |
| 2010/0241254 A1 | 9/2010 | McKinley et al. |
| 2011/0167348 A1 | 7/2011 | Silva et al. |

\* cited by examiner

† cited by third party

CONFIGURATION INTERFACE FOR A PROGRAMMABLE MULTIMEDIA CONTROLLER

BACKGROUND

1. Technical Field

The present disclosure relates generally to audio/video and home automation systems, and more particularly to techniques for configuring audio/video and home automation systems.

2. Background Information

One long-standing problem with audio/video (A/V) and home automation systems (collectively "multimedia systems) is that they generally require extensive configuration (e.g., programming). The components of a multimedia system typically may be interconnected (e.g., by cabling) in a wide variety of different manners. A user (e.g., an installer or end customer) may have difficulty determining all the connections that are required, or at least are desirable, between components.

Depending on the connections made between components of the multimedia system, certain functionality may be achievable. However, in order to realize this functionality, various ones of the components typically must know how to switch data between, control and otherwise interoperate with other components in a manner that will provide the functionality. Absent such configuration, the full potential of the multimedia system may not be realized. Unfortunately, this type of configuration has often required manually coding custom executable code by a trained installer. The costs of custom coding has generally been prohibitive, even for high-end systems.

What is needed is an improved technique for configuring multimedia systems that may address some or all of these shortcomings.

SUMMARY

According to one embodiment of the present disclosure, a configuration user interface is presented by a configuration application executing on a mobile device, which enables a user (e.g., an installer or customer) to quickly and simply configure multimedia systems. The configuration user interface is centered around photo-realistic depictions of the back panels of one or more primary components, such as primary programmable multimedia controllers, included in each multimedia system.

The configuration application executing on the mobile device may interact over a network with a hypertext transfer protocol daemon (HTTPD) or other web server executing on a processing subsystem of a programmable multimedia controller or other device, to obtain indications of multimedia systems, and within such systems, of components (e.g., programmable multimedia controllers or other detectable components). The configuration application may interact with the HTTPD or other web server to obtain summarized component profile information descriptive of components and photo-realistic depictions of the back panels of primary components.

Based on this information, and/or in conjunction with user-provided input received by the configuration application executing on the mobile device, the configuration application may show, in its configuration user interface, a photo-realistic depiction of the back panel of the primary component (e.g., primary programmable multimedia controller). Each photo-realistic depiction of a back panel includes photo-realistic depictions of connection ports found on the back panel, such as video connection ports, audio connection ports, control connection ports, and/or other types of connection ports. The configuration user interface of the configuration application may prompt the user to select another component to be connected to the primary component (e.g., primary programmable multimedia controller). For example, menus may be provided that include other detected components, as well as non-detectable components that may be manually indicated as present.

Upon selection of a particular other component, the configuration application, via the HTTPD or other web server, may access component profile information. Classes of potential connections (e.g., video, audio, control, etc.) between the primary component (e.g., primary programmable multimedia controller) and the other component are determined. For each class of potential connection, the configuration user interface may graphically guide the user to select a particular connection port on the photo-realistic depiction of the back panel of the primary component (e.g., primary programmable multimedia controller). Usable connection ports of each class of potential connection may be highlighted in the photo-realistic depiction of the back panel, and the user prompted to select (e.g., click on or touch) a desired useable connection port of each class of potential connection, for example, to clear the highlighting. For certain types of components (e.g. audio or video output components) being connected, the user may also be prompted to indicate a zone of a structure within which the component is located.

Based on selections made in the configuration user interface of the configuration application on the mobile device, a set of configuration data (e.g., an extensible markup language (XML) file that includes both connection and zone/device information) is generated and provided over the network, for example, via the HTTPD or other web server, to a configuration engine executing on the processing subsystem of a programmable multimedia controller or other device. More detailed connection configuration and zone configuration information (e.g., XML files) may be synthesized from the set of configuration data. A configuration compiler may take this information and, in conjunction with other information, such as service rules which indicate services particular components and collections of components may provide, generate a service implementation (e.g., an XML file) that represents the overall configuration of a multimedia system and the services it may provide. From the service implementation, a screen generator may generate user interfaces for accessing and controlling the services. Further, a configuration generator may compile the service implementation to generate a final configuration. Specific software processes within the multimedia system may be activated to cause display of the user interfaces and to provide the services to a user.

BRIEF DESCRIPTION OF THE DRAWINGS

The description below refers to the accompanying drawings, of which.

DETAILED DESCRIPTION OF ILLUSTRATIVE EMBODIMENTS

Figure 1:
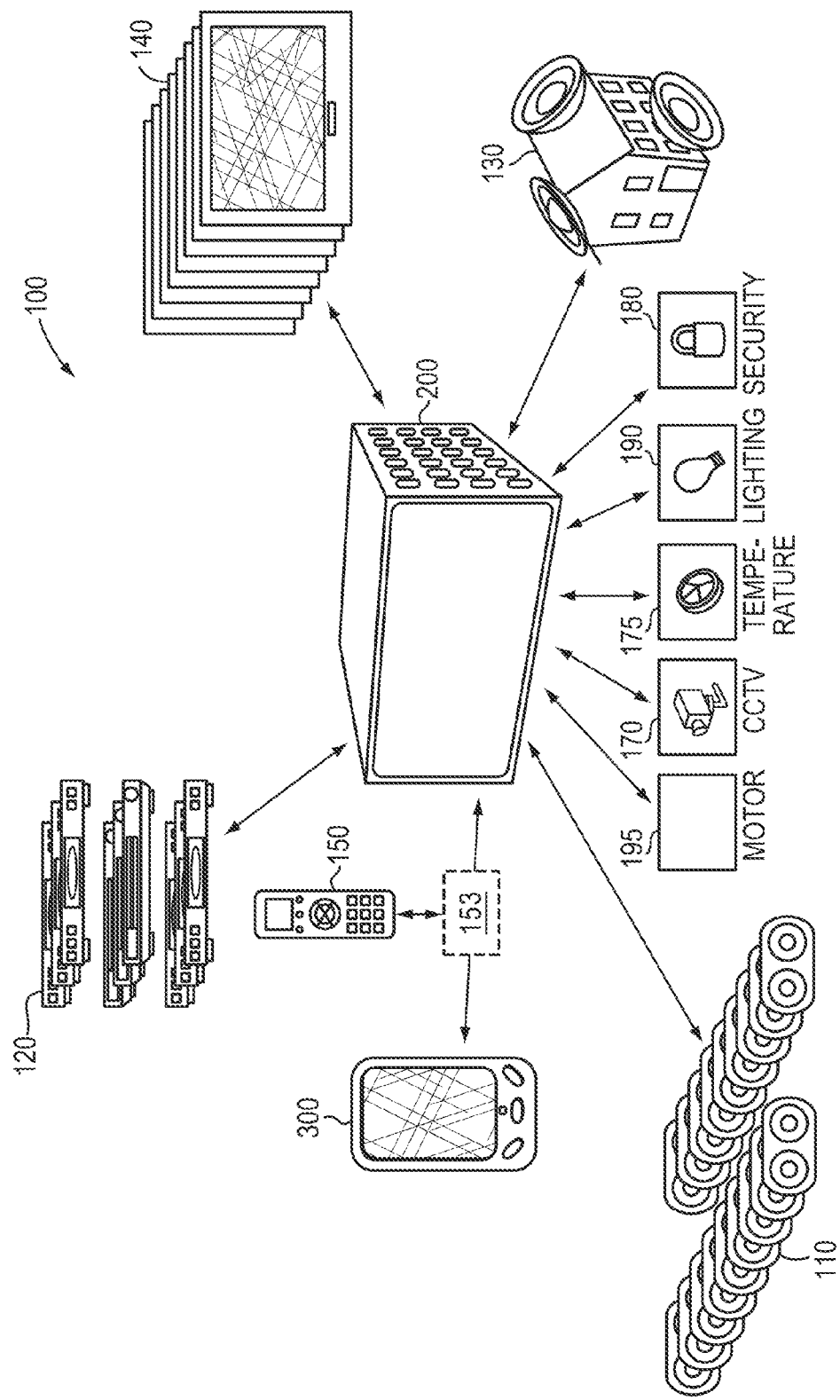
FIG. 1 is a block diagram of an example multimedia system within a structure (e.g., a home) that includes a programmable multimedia controller interconnected to a number of components.

FIG. 1 is a block diagram of an example multimedia system 100 within a structure (e.g., a home) that includes a programmable multimedia controller 200 interconnected to a number of components. As used herein, a "programmable multimedia controller" is a device capable of controlling, switching data between, and/or otherwise interoperating with a variety of electrical and electronic components, such as audio, video, telephony, data, security, motor-operated, relay-operated, heating, ventilation, and air conditioning (HVAC), energy management and/or other types of components. While a single programmable multimedia controller is shown in the example multimedia system of FIG. 1, multiple programmable multimedia controllers may be present in other (e.g., larger) multimedia systems. Further, multiple multimedia systems may be present within a single structure.

The programmable multimedia controller 200 may be coupled to a variety of audio/video (A/V) components within the structure, including audio source components 110, such as compact disk (CD) players, digital video disc (DVD) players, microphones, digital video recorders (DVRs), cable boxes, audio/video receivers, personal media players, and other components that source audio signals; may be coupled to a variety of video source components 120, such as digital video disc (DVD) players, digital video recorders (DVRs), cable boxes, audio/video receivers, personal media players and other components that source video signals; may be coupled to a variety of audio output components 130, such as amplifiers coupled to speakers, and other components that output audio; and may be coupled to a variety of video output components 140, such as televisions, monitors, and other components that output video.

Further, the programmable multimedia controller 200 may be coupled to other types of components. For example, the programmable multimedia controller 200 may be coupled to a closed-circuit television (CCTV) control system 170 that manages a system of cameras positioned about the structure, an HVAC and/or energy management system 175 that manages HVAC devices and/or energy management devices in the structure, a security system 180 that manages a plurality of individual security sensors in the structure, an electronic lighting controller 190 that manages lighting within the structure, and/or a motor-operated device controller 195, for example, an automatic window shade controller, that manages the operation of motor-operated devices within the structure. A wide variety of other components may also be coupled to the programmable multimedia controller 200.

The programmable multimedia controller 200 may receive user-input via one or more remote control units 150, which may be handheld, wall-mounted, or otherwise arm ranged. In some cases, a remote control unit 150 may communicate with the programmable multimedia controller 200 via an intermediate device 153. In other cases, the remote control unit 150 may communicate directly with the multimedia controller 200. Depending on the mode of communication of the remote control unit 150, the need for, and the form of, the intermediate device 153 may vary.

One type of remote control unit 150 that may be used with the programmable multimedia controller 200 is a "mobile device" 300. As used herein, a "mobile device" is an electronic device that is adapted to be transported on one's person, such as a tablet computer, for example the iPad® tablet available from Apple Inc.; a Smartphone, for example the iPhone® phone available from Apple Inc.; a portable media player, for example the iPod® touch available from Apple Inc.; or a notebook computer. A mobile device 300 may communicate directly with a programmable multimedia controller 200, or indirectly, through a intermediate device 153, using wireless network(s), such as WIFI or cellular network(s), and/or wired network(s).

In response to user-input on the one or more remote control units, the programmable multimedia controller 200 may provide selected "services" to the users within the structure. As used herein, a "service" is a media experience resulting from managed interaction among a selected group of the components. For example, a television viewing service may present television programming to a user as a result of managed interaction between a cable box or other video source component 120, a television or other video output component 140, amplified speakers or other audio output component 130, and potentially other components. Similarly, a video conferencing service may enable the placement of a video call by a user as a result of managed interaction between a camera and microphone of a CCTV control system 170, a television or other video output component 140, amplified speakers or another audio output component 130, and possibly other components. In general, one or more programmable multimedia controllers 200 may manage interaction between components by switching data between, issuing control commands to, and/or otherwise interoperating with the selected group of components.

In order to implement services, the programmable multimedia controller 200 (or multiple programmable multimedia controllers), and other components of the multimedia system 100, typically are configured (e.g., programmed). For example, a programmable multimedia controllers 200 is configured to know how it should switch data between, issue control commands to, and/or otherwise interoperate with components to provide services. As discussed below, a mobile device 300 executing a configuration application may be used by a user to configure programmable multimedia controller(s) and other components of multimedia systems.

Figure 2:
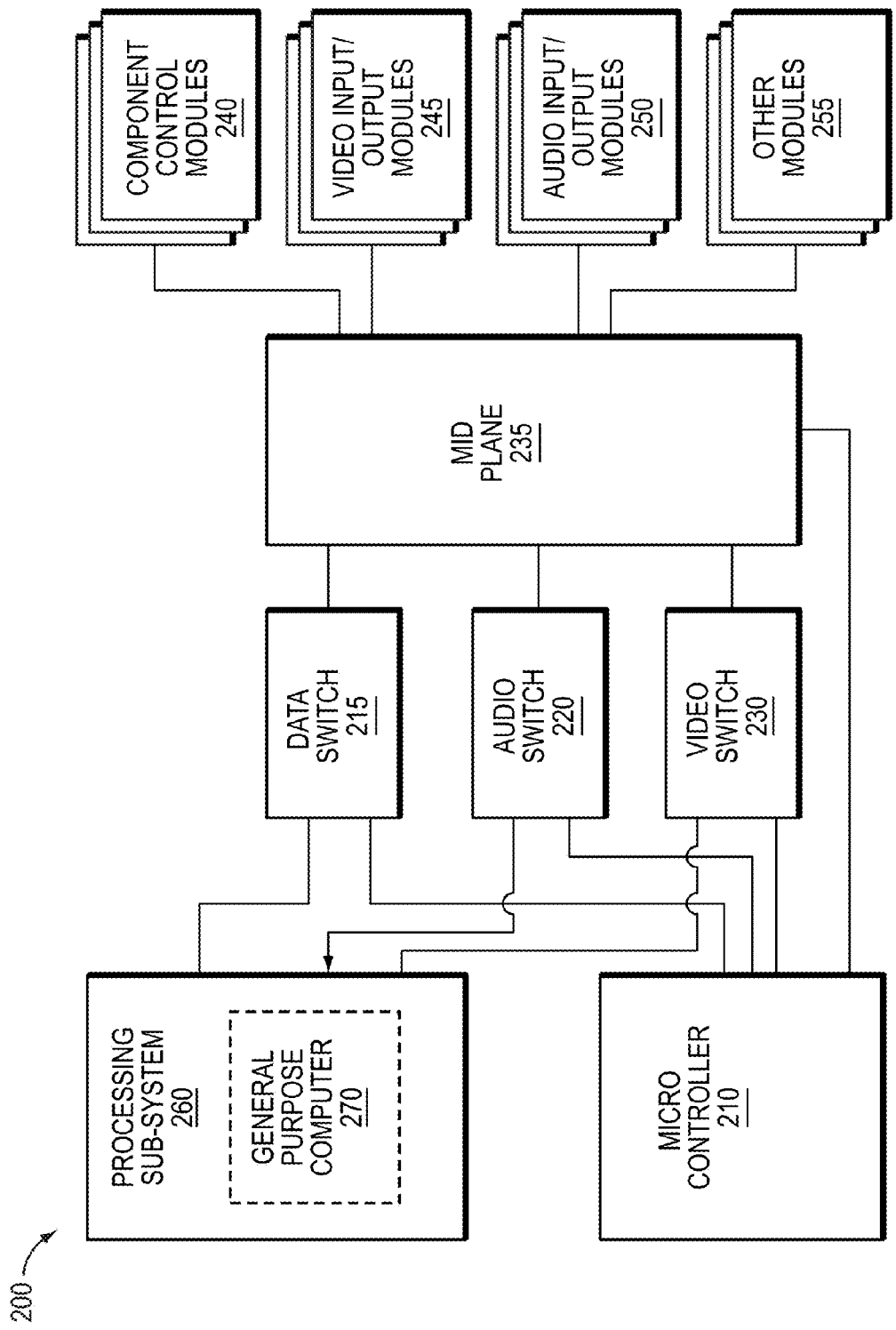
FIG. 2 is a schematic block diagram of example hardware of a programmable multimedia controller.

FIG. 2 is a schematic block diagram of example hardware of a programmable multimedia controller 200. A microcontroller 210 may manage general operations of the programmable multimedia controller 200. The microcontroller 210 may be coupled to a data switch 215, an audio switch 220 and a video switch 230. A mid plane 235 may interconnect the data switch 215, the audio switch 220 and the video switch 230 to input/output modules. The input/output modules may include one or more component control modules 240 that provide control-related connection ports, for instance, on a back panel of the programmable multimedia controller 200. Such control-related connection ports may include RS232 ports, General Purpose Input/Output (GPIO) ports, infrared (IR) interface ports, Ethernet ports, and the like. Further, the input/output modules may include one or more video input/output modules 245 that provide video connection ports, for instance, on the back panel of the programmable multimedia controller 200. Such video connection ports may include Video Graphics Array (VGA) ports, Component video ports, High-Definition Multimedia Interface (HDMI) ports, and the like. Further, the input output modules may include one or more audio input/output modules 250, that provide audio connection ports on the back panel of the programmable multimedia controller 200, such as Sony Philips Digital Interface (S/PDIF) digital audio ports, analog audio ports, and the like. Still further, the input output modules may include, one or more other types of modules 255.

At the core of the programmable multimedia controller 200 is a processing subsystem 260 that includes one or more processors (not shown) that execute instructions of application software stored in a memory (not shown). In one embodiment, the processing subsystem 260 may be structured as, or include, one or more "general-purpose computers" 270. A general-purpose computer 270 is a device having a processor and a memory that is configured to execute a general-purpose operating system (OS) (such as the OSX® operating system available from Apple Inc.) and that, depending on the application software executed in conjunction with the OS, is capable of providing a variety of different types of functionality. The processing subsystem 240 may execute one or more software applications to implement the functionality described herein, including a hypertext transfer protocol daemon (HTTPD) or other web server and a configuration engine, as discussed further below. Further, the processing subsystem 240 may store various types of data used to implement the functionality described herein, as discussed further below.

Figure 3:
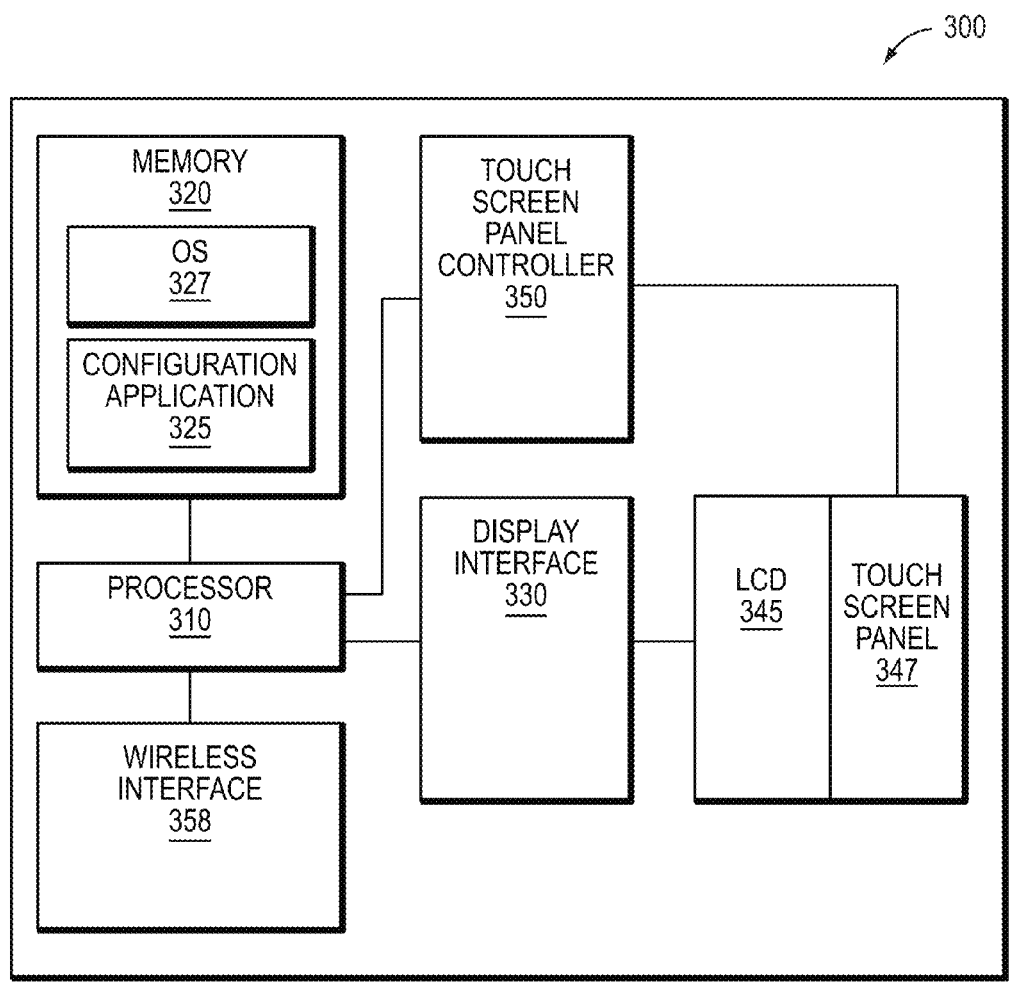
FIG. 3 is a schematic block diagram of hardware of an example mobile device on which the configuration user interface described herein may be provided.

FIG. 3 is a schematic block diagram of hardware of an example mobile device 300 on which the configuration user interface described herein may be provided. The mobile device 300 may include a processor 310, coupled to a memory 320 that stores processorexecutable instruction for an OS 327, for example, iOS available from Apple Inc., as well as for software applications. The software applications may include a configuration application 325 (e.g., a configuration "app") which enables the user to configure multimedia systems, as discussed further below.

The processor 310 may also be coupled to display interface 330 that visually renders graphics for presentation on a touch screen, for example, graphics for a configuration user interface. The touch screen includes both a display screen, such as a liquid crystal display (LCD) 345, and a touch screen panel 347, overlaid upon the display screen, which receives and registers touches from a user. Such touch information may be interpreted by a touch screen panel controller 350 and supplied to the processor 310. Further, an interface 360, that may include a wireless network transceiver, a cellular network interface and/or other types of wireless or wired transceiver(s), may be coupled to the processor 310 and facilitate communication directly, or indirectly, with a programmable multimedia controller 200 or other device.

According to one embodiment of the present disclosure, the configuration application 325 executing on the mobile device 300, may provide a configuration user interface that permits a user to configure multimedia systems. The configuration user interface is centered around photo-realistic depictions of the back panels of one or more primary components, such as primary programmable multimedia controllers 200, included in each multimedia system. As used herein, a "photo-realistic" depiction is a depiction that appears substantially similar to the actual visual appearance of the object. A "photo-realistic" depiction may be a photograph, a computer-generated rendering, manually drawn artwork, or other depiction that appears substantially similar to the actual visual appearance of the object. As used herein, a "back panel" of a component refers to one or more portions of the component upon which connection ports are located. While typically connection ports are located on the back face of components, connection ports may alternatively be located on another face, a portion of another face, or a combination of multiple faces, or a combination of portions of multiple faces. A "back panel" should be interpreted to encompass such alternatives.

Figure 4:
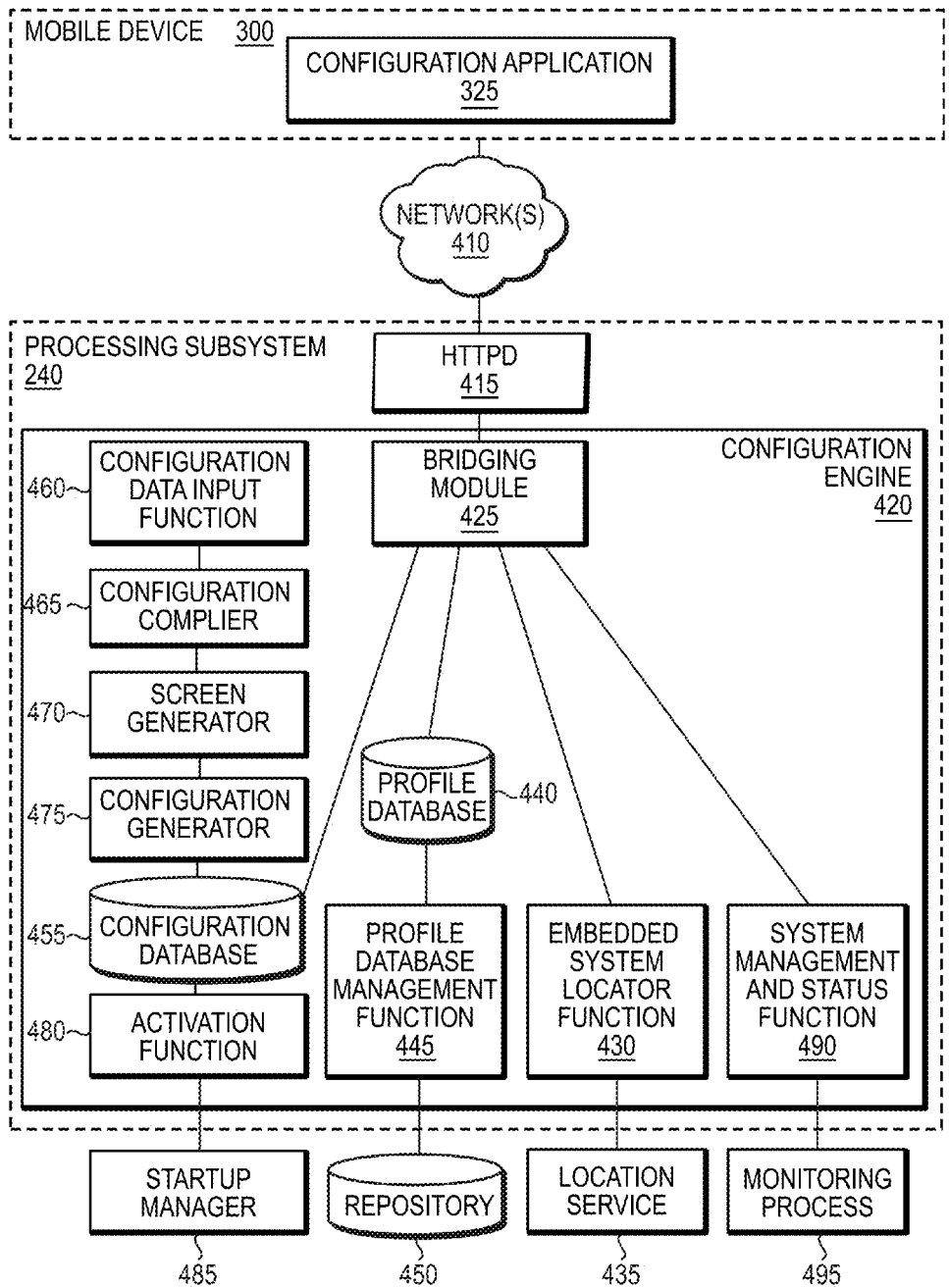
FIG. 4 is a schematic block diagram illustrating example software executing on the mobile device, and on the processing subsystem of a programmable multimedia controller or other component.

FIG. 4 is a schematic block diagram illustrating example software executing on the mobile device 300, and on the processing subsystem 240 of a programmable multimedia controller 200 or other component. The configuration application 325 executing on the mobile device 300 interacts over one or more networks 410 (e.g., wireless and/or wired networks) with a hypertext transfer protocol daemon (HTTPD) or other web server 415. The HTTPD or other web server 415 may be coupled to a configuration engine 420, executing on the processing subsystem 240. A bridging module (e.g., a HTTP bridging module) 425 may act as an interface between the HTTPD or other web server 415 and portions of the configuration engine 420.

Initially, the configuration application 325 may interact with the HTTPD or other web server 415 to obtain indications of multimedia systems 100, and within such systems, of components (e.g., programmable multimedia controllers or other detectable components) connected to the network(s) 410. These indications may be supplied by an embedded system locator function 430. The embedded systems locator function 430 may detect programmable multimedia controllers and/or other detectable components using a location service 435 that locates embedded processors (e.g., processors executing a Linux OS) coupled to the network(s) 410. The embedded systems locator function 430 may determine a type of each component, and supply this information.

The configuration application 325 may interact with the HTTPD or other web server 415 to obtain summarized component profile information descriptive of components within each multimedia system and photo-realistic depictions of the back panels of primary components. The summarized component profile information, along with the photo-realistic depictions of the back panels of primary components, may be stored in a profile database 440. A profile database management function 445 propagates the profile database 440, by accessing a repository 450 that includes more extensive component profiles (e.g., represented as XML files), service rules (e.g., represented as XML files), photo-realistic depictions of the back panels of certain components (e.g., programmable multimedia controllers), as well as other information. Each component profile in the repository 450 includes detailed indications of connections (e.g., on the back panel of the component), the commands that the component recognizes, and functions that the component is capable of performing. A subset of this information, along with certain photo-realistic depictions of the back panels, may be extracted and propagated to the profile database 440 for use by the configuration application 325.

Upon selection of a multimedia system and a primary component (e.g., a primary programmable multimedia controller) within that multimedia system, the configuration application 325 may show, in its configuration user interface, a photo-realistic depiction of the back panel of that primary component (e.g., primary programmable multimedia controller) obtained from the profile database 440. Each photo-realistic depiction of a back panel includes photo-realistic depictions of any connection ports found on the back panel, such as video connection ports, audio connection ports, control connection ports, and/or other types of connection ports. The configuration user interface of the configuration application 325 may prompt the user to select another component to be connected to the primary component (e.g., primary programmable multimedia controller). For example, menus may be provided that include other detected components, as well as non-detectable components that may be manually indicated as present.

Upon selection of a particular other component from the menus, the configuration application 325, via the HTTPD or other web server 415, may access component profile information from the profile database 440. Classes of potential connections (e.g., video, audio, control, etc.) between the primary component (e.g., primary programmable multimedia controller) and the other component are determined. For each class of potential connection, the configuration user interface may graphically guide the user to select a particular connection port on the photo-realistic depiction of the back panel of the primary component (e.g., primary programmable multimedia controller). Usable connection ports of each class of potential connection may be highlighted in the photo-realistic depiction of the back panel, and the user prompted to select (e.g., click on or touch) a desired useable connection port of each class of potential connection, for example to clear the highlighting. For certain types of components (e.g., audio or video output components) being connected, the user may also be prompted to indicate a zone of a structure within which the component is located.

Based on selections made in the configuration user interface of the configuration application 325, a set of configuration data (e.g., an extensible markup language (XML) file that includes both connection and zone information) is generated by the configuration application 325 and provided over the network(s) 410, via the HTTPD or other web server 415, to the configuration engine 420. The set of configuration data may be stored in a configuration database 455. From this set of configuration data, a configuration data input function 460 may synthesize more detailed connection configurations and zone configurations (e.g., also XML files). The connection configurations include, among other things, detailed indications of the connections between connection ports of respective components. The zone configurations include, among other things, detailed indications of the components that are present in a particular zone (e.g., room) within the structure (e.g., home). The connection configurations and zone configurations may be provided to a configuration compiler 465, which uses them in conjunction with other information, such as service rules from the repository 450, to generate a service implementation (e.g., an XML file) that represents the overall configuration of a multimedia system and the services it may provide. From the service implementation, a screen generator 470 may generate user interface screens for accessing and controlling the services. Further, a configuration generator 475 may compile the service implementation to generate a final configuration, which is also stored in the configuration database 455. A configuration history and activation function 480 may provide the final configuration to a startup manager 485, which activates specific software processes within the multimedia system to cause display of the user interfaces and to provide the services to a user.

In some embodiments, the configuration user interface of the configuration application 325 may also show monitored system status of a multimedia system 100 and/or of individual components. A system management and status function 490 may interact with a monitoring process 495 to obtain status information. The status information may then be supplied to the configuration application 325 for display, via the HTTPD or other web sever 415.

Figure 5A:
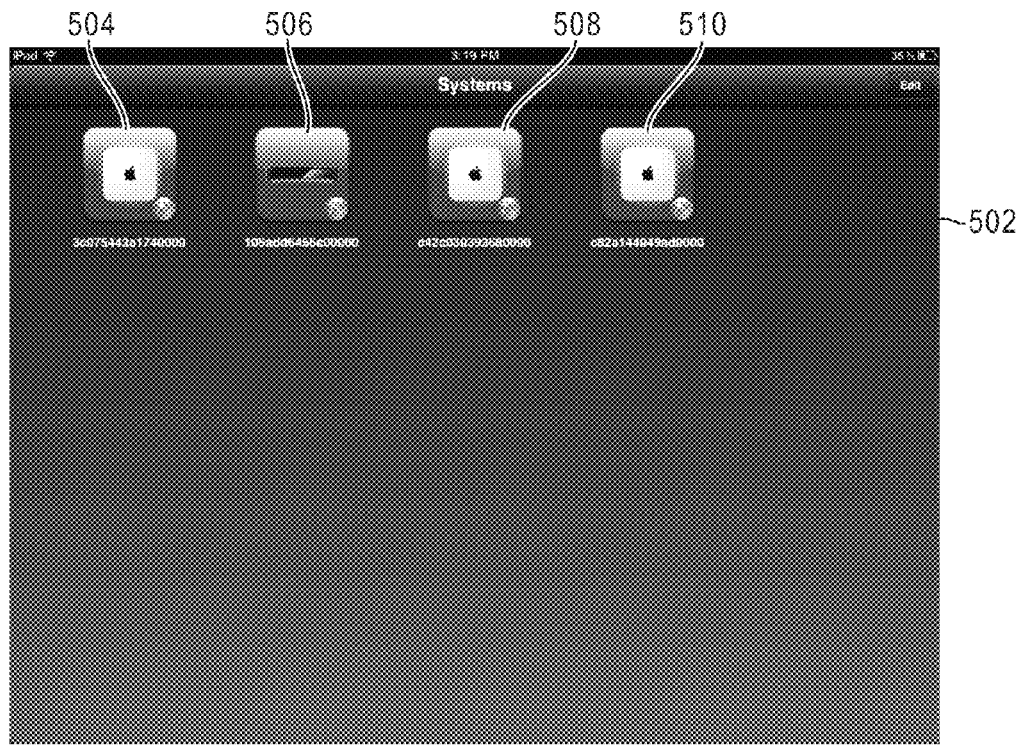
FIG. 5A is a screen shot of an example configuration user interface displayed by the configuration application, showing representations (e.g., icons) of detected multimedia systems.

FIG. 5A is a screen shot 502 of an example configuration user interface displayed by the configuration application 325, showing representations (e.g., icons) 504-510 of detected multimedia systems 100. As discussed above, multimedia systems 100 coupled to the network(s) 410 may be detected by the embedded system locator function 430 using the location service 435.

Figure 5B:
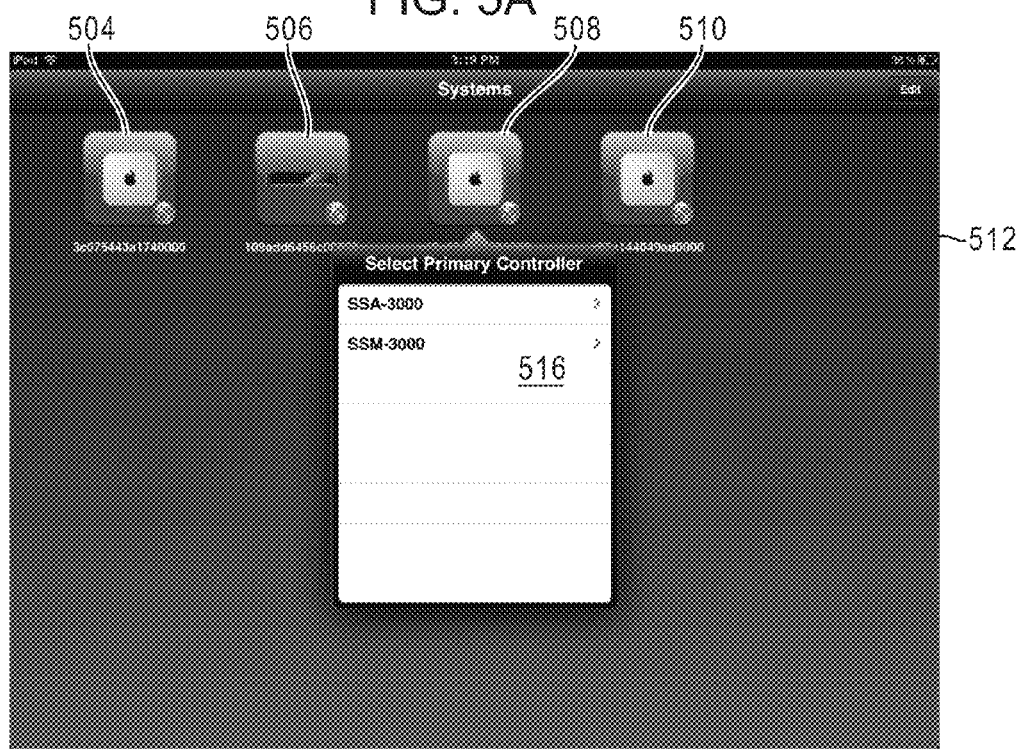
FIGS. 5B and 5C are screen shots of the example configuration user interface displayed by the configuration application, illustrating the selection of a primary programmable multimedia controller.
Figure 5C:
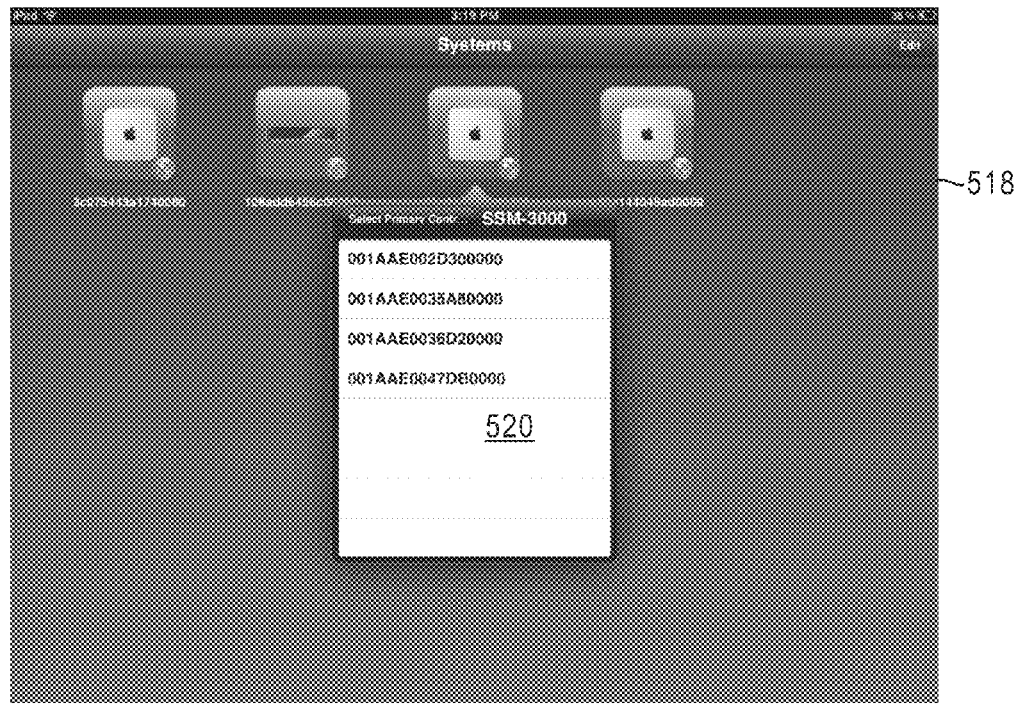
Figure 5D:
FIGS. 5D-5G are screen shots of the example configuration user interface displayed by the configuration application, illustrating the selection of a first component (e.g., a cable television box) to be connected to the primary programmable multimedia controller.
Figure 5E:
Figure 5F:
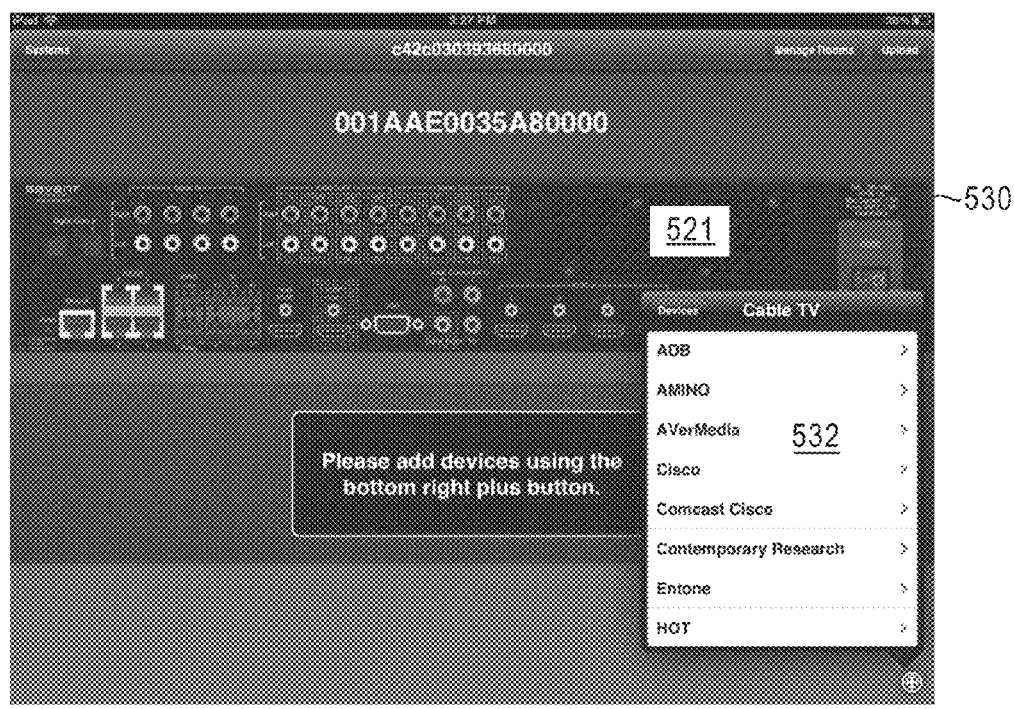
Figure 5G:

FIGS. 5B and 5C are screen shots 512, 518 of the example configuration user interface displayed by the configuration application 325, illustrating the selection of a primary programmable multimedia controller. Upon a user selecting (e.g., clicking on or touching) a particular representations 508 of a multimedia system 100, types of programmable multimedia controllers are shown, for example, in a menu 516. Upon selection of a type, programmable multimedia controllers of that type may be shown, for example, in a menu 520. A particular programmable multimedia controller may be selected (e.g., clicked on or touched) by a user.

FIGS. 5D-5G are screen shots 522, 524, 530, 534 of the example configuration user interface displayed by the configuration application 325, illustrating the selection of a first component (e.g., a cable television box) to be connected to the primary programmable multimedia controller. In response to a prompt 523, a user may begin component selection. Types of components that may be selected are shown, for example, in a menu 526. The types of components may include types of components that have been detected in the network(s) 410 by the embedded systems locator function 430, as well a types of non-detectable components that may be manually indicated as present. Upon a user selecting (e.g., clicking on or touching) a type of component (e.g., cable television boxes), sub types (e.g., brands) may be shown, for example, in a menu 532. Upon a user selecting (e.g., clicking on or touching) a sub type of component (e.g., Scientific Atlanta brand), individual components (e.g., models) may be shown, for example, in a menu 536, and the user prompted to select there from.

Figure 5H:
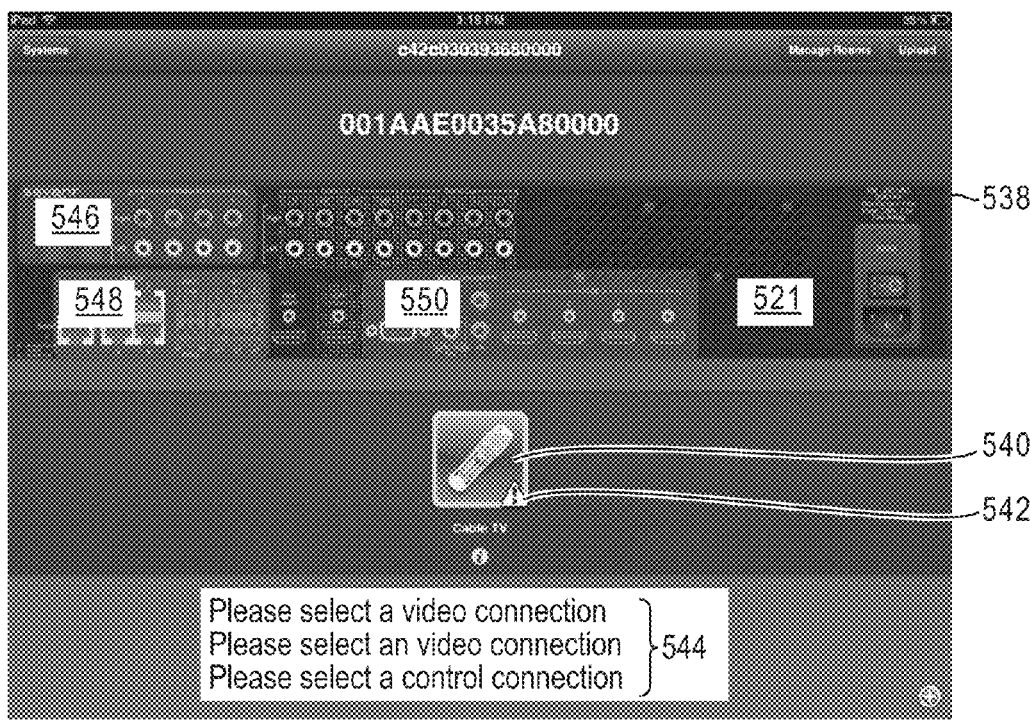
FIG. 5H is a screen shot of the example configuration user interface displayed by the configuration application, showing a representation (e.g., icon) of the added first component.
Figure 5I:
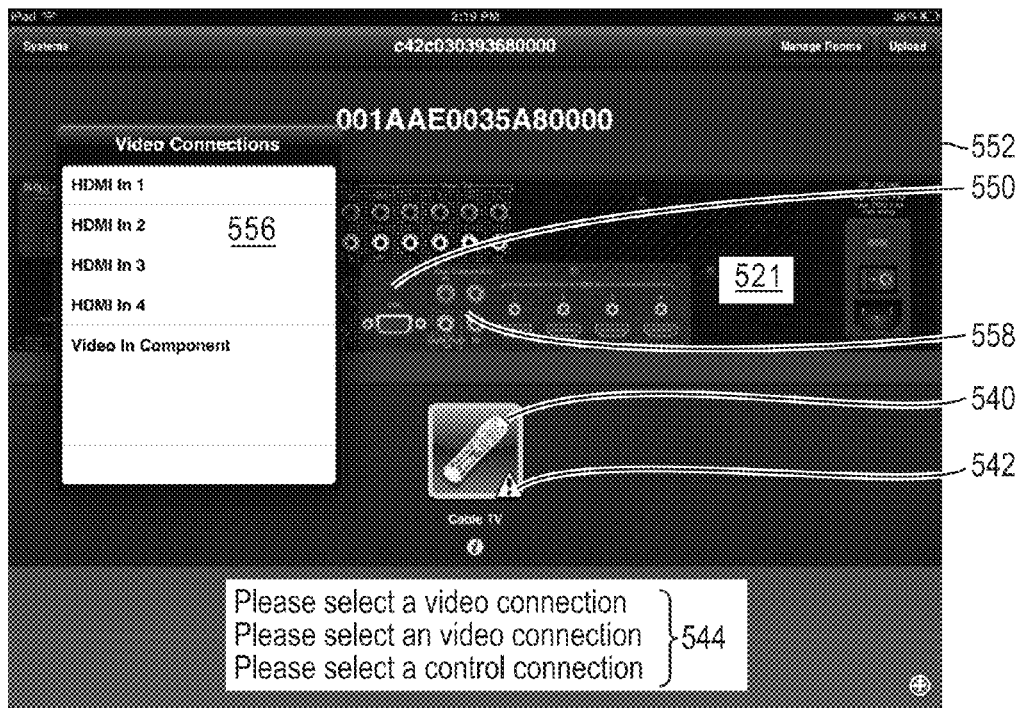
FIGS. 5I-5L are screen shots of the example configuration user interface displayed by the configuration application, illustrating the selection of connections between the first component and the primary programmable multimedia controller.
Figure 5J:
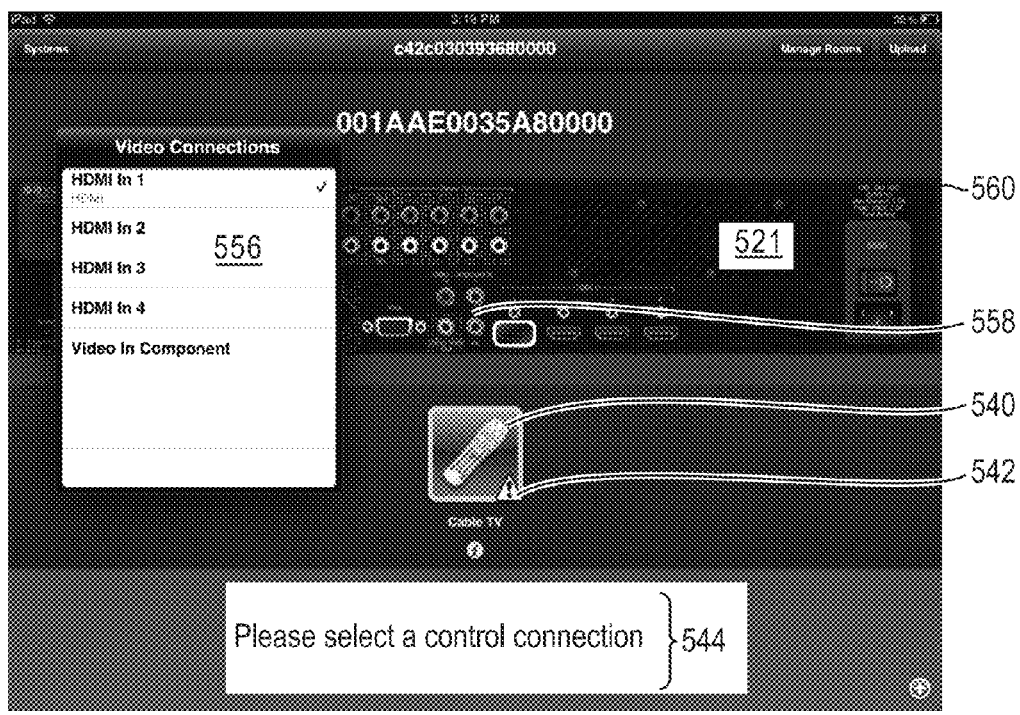
Figure 5K:
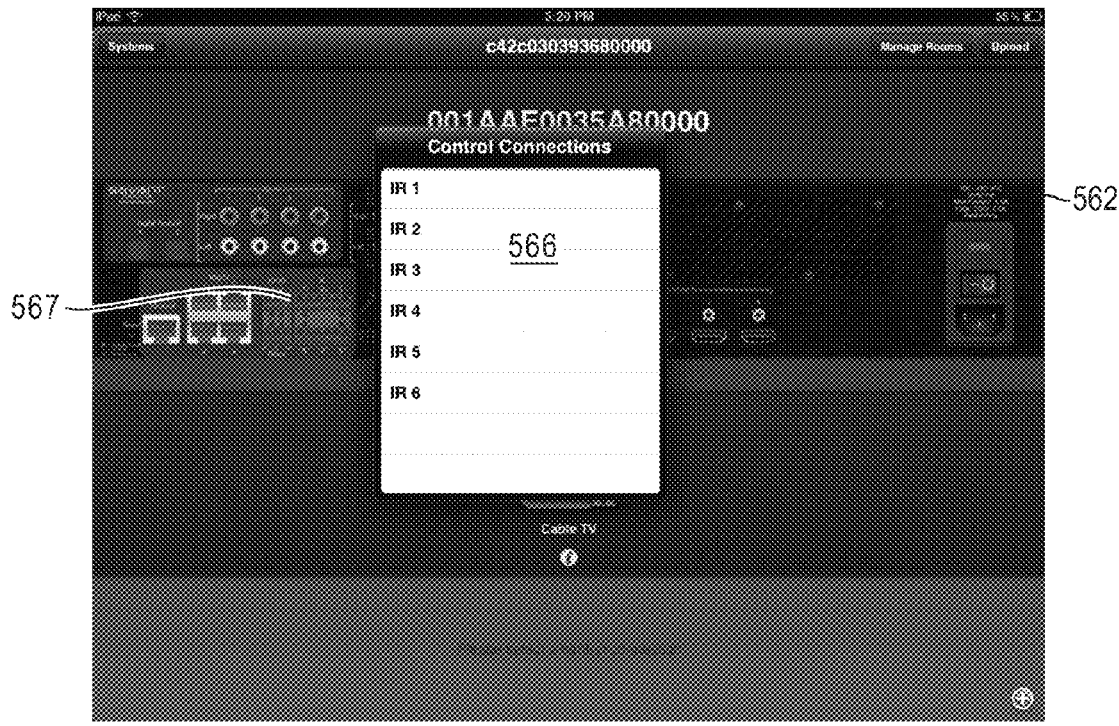
Figure 5L:
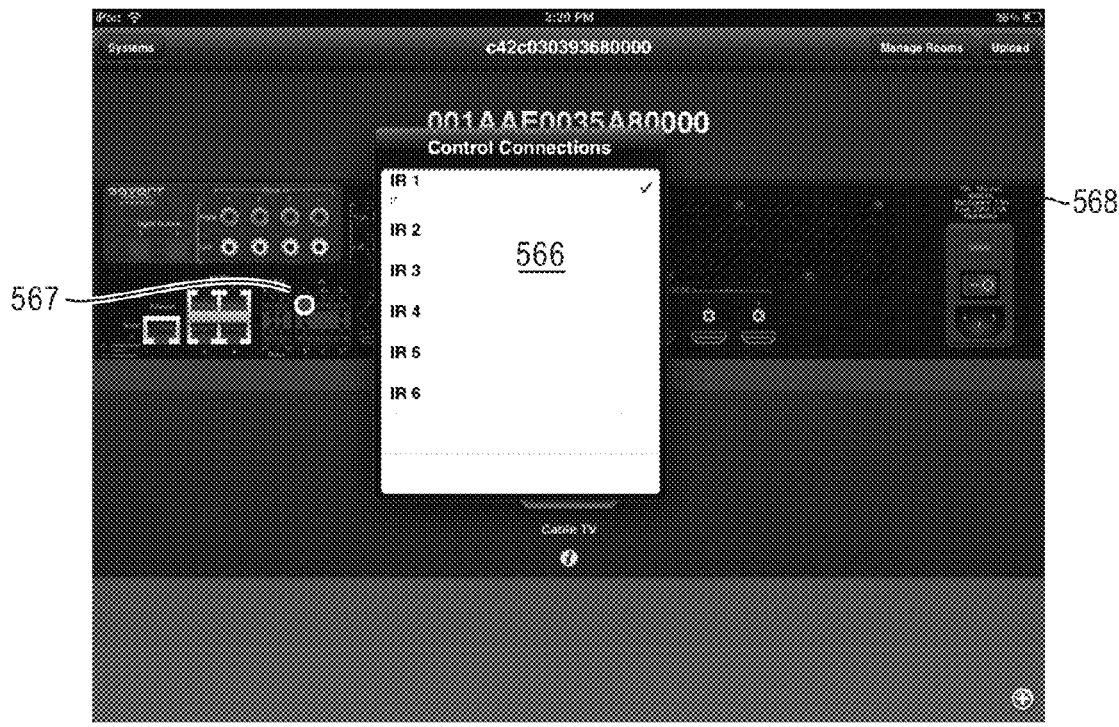

FIG. 5H is a screen shot 538 of the example configuration user interface displayed by the configuration application 325, showing a representation (e.g., icon) 540 of the added first component. A flag 542 may visually indicate that connections between the first component and the primary multimedia controller have not been defined. Further, text prompts 544 may call out classes of potential connection (e.g., video, audio and control). For each class of potential connection, the user is graphically guided to select a particular connection port, on the photo-realistic depiction 521 of the back panel of a programmable multimedia controller, to which the first component is to connect. For instance, potential video connections may be highlighted in a first color or pattern 550, potential audio connections may be highlighted in a second color or pattern 546, while potential control connections may be highlighted in a third color or pattern 548.

FIGS. 5I-5L are screen shots 552, 560, 562, 568 of the example configuration user interface displayed by the configuration application 325, illustrating the selection of connections between the first component and the primary programmable multimedia controller. Upon a user selecting (e.g., clicking on or touching) a highlighting 550 for the class of video connections on the photo-realistic depiction 521 of the back panel of a primary programmable multimedia controller, the user is prompted by menu 556 to select a particular video connection to which the first component will connect. The user may select a useable video connection port by selecting (e.g., clicking on or touching) a particular photo-realistic depiction of the port 558. Alternatively, the user may select a useable video connection port by selecting an indication of a particular video connection in the menu 556. The highlighting 550 of the class of video connections may be cleared now that a connection port has been selected. Further, the selected connection port may be indicated to the user, for example, by a visual change to the photo-realistic depiction of the connection port 558 (e.g., a border around the connection port) and/or an indication in the menu 556.

In a similar manner, upon a user selecting (e.g., clicking on or touching) highlighting 548 for the class of control connections on the photo-realistic depiction 521 of the back panel of a primary programmable multimedia controller, the user is prompted by menu 566 to select a control connection. The user may select a useable control connection port by selecting (e.g., clicking on or touching) a particular photo-realistic depiction of the port 567, or its indication of the port in the menu 566. As with video connections, the highlighting 548 of the class of control connections may be cleared now, and the selected connection port indicated to the user, for example, by a visual change to the photo-realistic depiction of the connection port 567 (e.g., a border around the connection port) and/or an indication in the menu 566. Audio connections may be defined in a similar manner.

A second component may be connected to the primary programmable multimedia controller in a manner similar to as shown in FIGS. 5D-5G, and connections to the ports on the back-panel of the primary programmable multimedia controller indicated in a manner similar to as shown in FIGS. 5I-5L.

Figure 5M:
FIG. 5M is a screen shot of the example configuration user interface displayed by the configuration application, showing a representation (e.g., icon) of an added second component (e.g., a Blu-ray player)

FIG. 5M is a screen shot 570 of the example configuration user interface displayed by the configuration application 325, showing a representation (e.g., icon) 572 of an added second component (e.g., a Blu-ray player). As with a first component, a flag 574 and prompts 576 may be shown. Also, similar to the first component, the user may be graphically guided to select a particular connection port on the photo-realistic depiction 521 of the back panel of a programmable multimedia controller to which the second component is to connect, by highlighting 578, 580, 582.

Figure 5N:
FIG. 5N is a screen shot of the example configuration user interface displayed by the configuration application, illustrating the selection of connections between the second component and the primary programmable multimedia controller.

FIG. 5N is a screen shot 584 of the example configuration user interface displayed by the configuration application 325, illustrating the selection of connections between the second component and the primary programmable multimedia controller. As with a first component, the user is prompted to select connection ports, for example, by menus such as an audio connection menu 586.

Additional components may be connected to the primary programmable multimedia controller in a similar manner, and connections to the ports on the back-panel of the primary programmable multimedia controller indicated in a similar manner.

Figure 5O:
FIG. 5O is a screen shot of the example configuration user interface displayed by the configuration application, showing addition of a third component (e.g., a high definition (HD) television)

FIG. 5O is a screen shot 586 of the example configuration user interface displayed by the configuration application 325, showing addition of a third component (e.g., a high definition (HD) television).

For components that are audio output components and/or video output components, the user may be prompted to indicate a zone of a structure within which the component is located.

Figure 5P:
FIG. 5P is a screen shot of the example configuration user interface displayed by the configuration application, illustrating the selection of a zone for the third component.

FIG. 5P is a screen shot 588 of the example configuration user interface displayed by the configuration application 325, illustrating the selection of a zone for the third component. The user may select a zone by selecting (e.g., clicking on or touching) an indication in the menu 590. Alternatively, the user may select a zone in other manners, for example, by dragging a representation of the component to a location on a map of the structure (not shown) or other graphical technique.

Figure 5Q:
FIGS. 5Q-5S are screen shots of an example configuration user interface displayed by the configuration application, illustrating the selection of connections between the third component and the primary programmable multimedia controller.
Figure 5R:
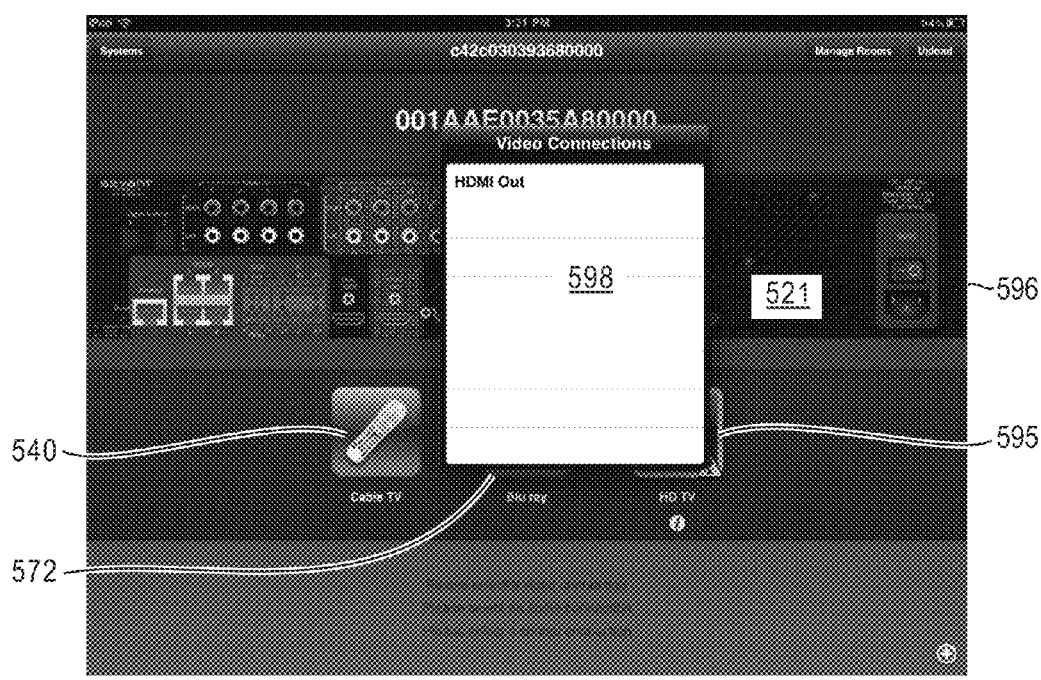
Figure 5S:

FIGS. 5Q-5S are screen shots 594, 596, 600 of an example configuration user interface displayed by the configuration application 325, illustrating the selection of connections between the third component and the primary programmable multimedia controller. As with a first and second components, upon selecting the visual representation (e.g., icon) 595 of the third component, the user is prompted to select connection ports, for example, by menus such as a video connection menu 598.

After all desired components are connected to the primary programmable multimedia controller, the user may name the controller/configuration, and upload the set of configuration data that has been defined, over the network(s) 410, via the HTTPD or other web server 415, to the configuration engine 420.

Figure 5T:
FIG. 5T is a screen shot of the example configuration user interface displayed by the configuration application, illustrating the naming of the primary programmable multimedia controller.

FIG. 5T is a screen shot 604 of the example configuration user interface displayed by the configuration application 325, illustrating the naming of the primary programmable multimedia controller. A keyboard 604 may be displayed, each key of which may be selected (e.g., clicked on or touched), to facilitate text entry.

Figure 5U:
FIG. 5U is a screen shot of the example configuration user interface displayed by the configuration application, illustrating a complete configuration ready for upload.

FIG. 5U is a screen shot 606 of the example configuration user interface displayed by the configuration application 325, illustrating a complete configuration ready for upload. When the configuration is complete, no flags are shown in connection with the representations (e.g., icons) 540, 572, 595 of the connected components. An upload interface element (e.g., button) 608 may be selected (e.g., clicked on or touched) by the user, to trigger upload of the set of configuration data to the configuration engine 420, where it is turned into, ultimately, a final configuration that is activated to provide services, and into user interface screens for interacting with those services.

Figure 6:
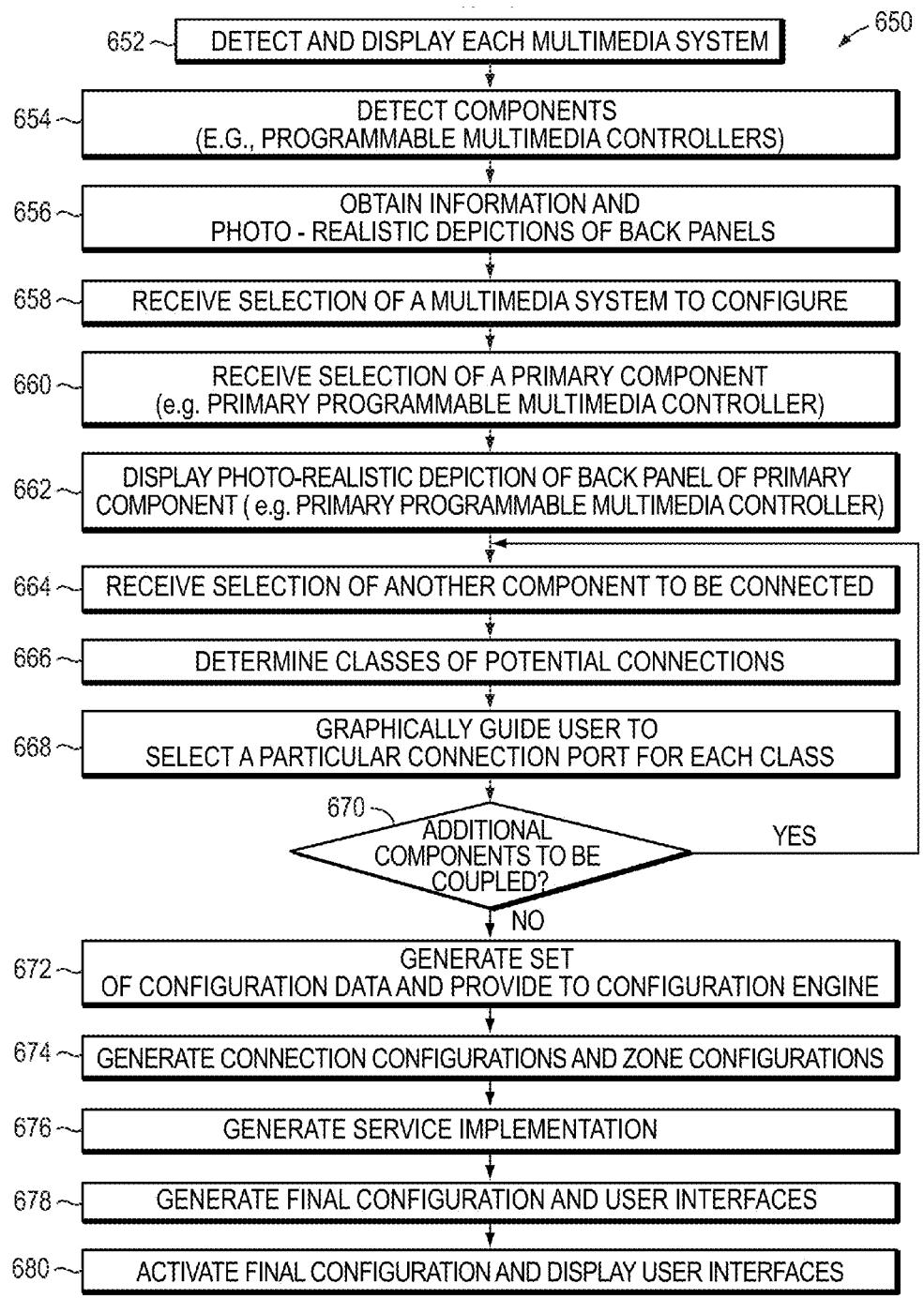
FIG. 6 is a flow diagram of an example sequence of steps that may be implemented to configure multimedia systems to provide services to a user.

FIG. 6 is a flow diagram of an example sequence of steps 650 that may be implemented by the configuration application 325 executing on the mobile device 300 and the configuration engine 420 executing on the processing subsystem 240 of a programmable multimedia controller 200, or other component, to configure multimedia systems to provide services to a user. At step 652, each multimedia system 100 is detected and displayed to the user, for example, using the embedded system locator function 430 and location service 435. At step 654, certain components (e.g., programmable multimedia controllers or other detectable components) are detected. At step 656, summarized component profile information and photo-realistic depictions of the back panels of certain components are obtained, and stored in the profile database 440 for use by the configuration application 325. At step 658, in the configuration user interface of the configuration application 325, a selection is received of a multimedia system 100 to configure. At step 660, in the configuration user interface of the configuration application 325, a selection is received of a primary component (e.g., a primary programmable multimedia controller) within the selected multimedia system. At step 662, a photo-realistic depiction of the back panel of the primary component (e.g., primary programmable multimedia controller), including photo-realistic depictions of connection ports located thereon, is displayed to the user in the configuration user interface. The user is prompted to select another component to be connected to at least some of the connection ports of the primary component (e.g., primary programmable multimedia controller). At step 664, a selection of another component to be connected is received by the configuration user interface. At step, 666, classes of potential connections (e.g., video, audio, control, etc.) to the primary component (e.g., primary programmable multimedia controller) are determined. At step 668, the configuration user interface graphically guides the user to select a particular connection port for each class, by highlighting each class on the photo-realistic depiction of the back panel, and prompting the user to select (e.g., click on or touch) a desired useable connection port of each class to clear the highlighting. At step 670, upon selection of a connection port for each class, it is determined if additional components are to be coupled to the primary component (e.g., primary programmable multimedia controller). If so, execution loops to step 664.

If not, execution proceeds to step 672, where a set of configuration data (e.g., an extensible markup language (XML) files that includes both connection and zone information) is generated by the configuration application 325 and provided over the network(s) 410, via the HTTPD or other web server 415, to the configuration engine 420. At step 674, more detailed connection configurations and zone configurations are generated by the configuration data input function 460. At step 676, the configuration compiler 465, uses the connection configurations and zone configurations, in conjunction with other information, such as service rules, to generate a service implementation that represents the overall configuration of the multimedia system and the services it may provide. At step 678, a final configuration for providing services, and user interfaces for interacting with those services, are generated by compiling the service implementation. At step 680, the final configuration is activated, the user interfaces displayed, and the services provided to a user of the multimedia system 100.

While the above description discusses certain embodiments of the present disclosure, it should be apparent that further modifications and/or additions may be made without departing from the disclosure's intended spirit and scope.

While it is described above that the configuration user interface includes photo-realistic depictions of the back panels of one or more primary components (e.g., primary programmable multimedia controllers), photo-realistic depictions of the back panels of the other components may also be displayed. As with the one or more primary components, the configuration user interface may graphically guide the user to select particular connection ports on the photo-realistic depiction of the back panels. In some implementations, the photo-realistic depictions of the back panels of the other components may be displayed simultaneous to the display of the realistic depiction of the back panel of a primary component (e.g., programmable multimedia controller). In such case, a user may be prompted to indicate desired connections between by making selections on each of the photo-realistic depictions of the back panels. Once made, such connections may be graphically represented, for example, through illustrations of wires connecting the ports, corresponding highlighting, or other graphical representations.

Further, while is described above that the configuration engine 420 and HTTPD 410 are executing on the processing subsystem 240, it should be understood that one or both of these applications may executed elsewhere, for example, on a remote Internetaccessible server (i.e., in the "cloud"). Such a cloud-based implementation may offer certain advantages. For example, updated component profiles may be made readily available and sets of configuration data for multimedia systems may be securely backed up offsite, to provide greater failure tolerance.

Still further, while is described above that the configuration user interface graphically guides the user to select particular connection ports on the photo-realistic depiction of the back panel, in some implementations, such selection may be made automatically, and the user simply shown the result. In such case, a novice user may be freed from making many configuration selections.

Yet further, while the above description refers to a variety of specific hardware units for executing various functions, it should be remembered that many of the techniques discussed herein may alternately be implemented by a variety of different hardware structures (for example, a variety of different programmable logic circuits, specially-designed hardware chips, analog or partially-analog devices, and other types of devices), may be implemented in software (for example as computer-executable instructions stored in a non-transitory computer-readable media for execution on a processor or other hardware device), or may be implemented in a combination of hardware and software. Accordingly, it should be remembered that the above descriptions are meant to be taken only by way of example.

What is claimed is:

1. A method comprising:
receiving, on a mobile device, a selection of a primary component of a multimedia system to be configured;
displaying, on the mobile device, a photo-realistic depiction of a back panel of the primary component, the photo-realistic depiction of the back panel including photo-realistic depictions of connection ports located thereon, wherein a depiction of an object is considered photo-realistic when it appears substantially similar to an actual visual appearance of the object;

receiving a selection of another component to be connected to the primary component;

determining one or more classes of potential connections between the another component and the primary component;

for each class of potential connection, graphically guiding the user to select a particular connection port on the photo-realistic depiction of the back panel of the primary component for the class of potential connection;

in response to selections of particular connection ports from the user, generating a set of configuration data for the multimedia system; and based on the set of configuration data, configuring software processes within the multimedia system to provide services enabled by the connection to the another component to the particular connection ports.

2. The method of claim 1, wherein the graphically guiding further comprises:

for each class of potential connection, highlighting one or more of the photo-realistic depictions of connection ports on the photo-realistic depiction of the back panel that are usable for the class of potential connection.

3. The method of claim 2, further comprising:

in response to selection of a particular connection port for the class of potential connection, clearing the highlighting of the one or more of the photo-realistic depictions of connection ports on the photo-realistic depiction of the back panel for the class of potential connection.

4. The method of claim 1, wherein the user selects particular connection ports by touching respective photo-realistic depictions of the particular connection ports on a touch screen of the mobile device.

5. The method of claim 1, wherein the configuring further comprises:

providing the set of configuration data over a network to a processing subsystem of a device separate from the mobile device.

6. The method of claim 5, wherein the processing subsystem is a portion of a programmable multimedia controller located within the multimedia system.

7. The method of claim 1, wherein the configuring further comprises:

generating a service implementation that represents an overall configuration of the multimedia system and the services the multimedia system may provide.

8. The method of claim 7, wherein the configuring further comprises:

compiling the service implementation to generate a final configuration for configuring the software processes within the multimedia system to provide services, and one or more user interfaces for interacting with those services; and activating the final configuration and displaying at least one of the user interfaces.

9. The method of claim 1, further comprising:

detecting a plurality of multimedia systems;

displaying representations of each of the detected multimedia systems on the mobile device; and receiving a selection of the multimedia system from the detected plurality of multimedia systems.

10. The method of claim 1, further comprising:

detecting one or more components within the multimedia system, and receiving the selection of the primary component of the multimedia system from among the one or more detected components.

11. The method of claim 1, wherein the primary component is a primary programmable multimedia controller configured to control a plurality of different types of electronic components including one or more audio source components, one or more video source components, one or more audio output components or one or more video output components.

12. The method of claim 1, wherein the mobile device is a tablet computer.

13. The system comprising:

a programmable multimedia controller having a back panel with connection ports located thereon, the programmable multimedia controller configured to control a plurality of different types of electronic components including one or more audio source components, one or more video source components, one or more audio output components or one or more video output components; and a configuration application executable on a mobile device that includes a processor, the configuration application, when executed on the processor, operable to:

receive a selection of the programmable multimedia controller as a primary programmable multimedia controller of a multimedia system to be configured, display a photo-realistic depiction of the back panel of the primary programmable multimedia controller, the photo-realistic depiction of the back panel to include photo-realistic depictions of the connection ports located thereon, wherein a depiction of an object is considered photo-realistic when it appears substantially similar to an actual visual appearance of the object, receive a selection of another component to be connected to the primary programmable multimedia controller, for each of one or more classes of potential connections between the another component and the primary programmable multimedia controller, graphically guide the user to select a particular connection port on the photo-realistic depiction of the back panel of the primary programmable multimedia controller for the class of potential connection, in response to selections of particular connection ports from the user, generate a set of configuration data for the multimedia system, and based on the set of configuration data, configure software processes within the multimedia system to provide services enabled by the connection to the another component to the particular connection ports.

14. The system of claim 13, wherein the configuration application, when executed on the processor, is operable to graphically guide by, for each class of potential connection, highlighting one or more of the photo-realistic depictions of connection ports on the photo-realistic depiction of the back panel that are usable for the class of potential connection.

15. The system of claim 14, wherein the configuration application, when executed on the processor, is further operable to:

in response to selection of a particular connection port for the class of potential connection, clear the highlighting of the one or more of the photo-realistic depictions of connection ports on the photo-realistic depiction of the back panel for the class of potential connection.

16. The system of claim 13, wherein the mobile device comprises a touch screen that is configured to display the photo-realistic depiction of the back panel of the primary programmable multimedia controller, and receive touches from the user upon particular photo-realistic depictions of connection ports on the photo-realistic depiction of the back panel that indicate selections of particular connection ports.

17. The system of claim 13, wherein the primary programmable multimedia controller comprises a processing subsystem configured to execute a configuration engine, and the configuration application, when executed on the processor, is further operable to:
provide the set of configuration data over a network to the configuration engine.

18. The system of claim 17 wherein the configuration engine, when executed by the processing subsystem, is operable to:
generate a service implementation that represents an overall configuration of the multimedia system and the services the multimedia system may provide,
compile the service implementation to generate a final configuration for configuring software processes within the multimedia system to provide services, and
activate the final configuration in the multimedia system.

19. The system of claim 13, wherein the mobile device is a tablet computer.

20. A non-transitory computer readable media storing executable instructions that when executed by a processor are operable to:
receive a selection of a primary component of a multimedia system to be configured;
display a photo-realistic depiction of a back panel of the primary component, the photo-realistic depiction of the back panel to include photo-realistic depictions of connection ports located thereon, wherein a depiction of an object is considered photo-realistic when it appears substantially similar to an actual visual appearance of the object;
receive a selection of another component to be connected to the primary component;
determine one or more classes of potential connections between the another component and the primary component;
for each class of potential connection, graphically guide the user to select a particular connection port on the photo-realistic depiction of the back panel of the primary component for the class of potential connection;
in response to selections of particular connection ports from the user, generate a set of configuration data for the multimedia system; and
based on the set of configuration data, configure software processes within the multimedia system to provide services enabled by the connection to the another component to the particular connection ports.

* * * * *

UNITED STATES PATENT AND TRADEMARK OFFICE
CERTIFICATE OF CORRECTION

PATENT NO.        : 8,972,858 B2  
APPLICATION NO.   : 13/451310  
DATED             : March 3, 2015  
INVENTOR(S)       : Robert P. Madonna et al.

Page 1 of 1

It is certified that error appears in the above-identified patent and that said Letters Patent is hereby corrected as shown below:

In the Specification:

Column 4, Line 40 should read:
may be handheld, wall-mounted, or otherwise arranged. In Column 5, Line 58 should read:
include, one or more "general-purpose computers". A Column 6, Line 10 should read:
that stores processor-executable instruction for an OS Column 12, Line 31 should read:
remote Internet-accessible server (i.e., in the "cloud"). Such a Signed and Sealed this
Seventh Day of July, 2015

Michelle K. Lee
*Director of the United States Patent and Trademark Office*